United States Patent [19]

Hartman

[11] Patent Number: 5,116,252
[45] Date of Patent: May 26, 1992

[54] IN-LINE SLEEVE VALVE HAVING VELOCITY GUIDE PRESSURE EQUALIZATION AND DRIVE ASSEMBLY WITH IMPROVED DRIVE PIN MOUNTINGS

[76] Inventor: Thomas A. Hartman, 700 Capac Ct., St. Louis, Mo. 63125

[21] Appl. No.: 739,917

[22] Filed: Aug. 2, 1991

[51] Int. Cl.⁵ .................................. F16K 3/26
[52] U.S. Cl. ........................ 137/625.3; 137/625.33; 251/121; 251/231
[58] Field of Search ............ 137/625.3, 625.33; 251/121, 231

[56] References Cited

U.S. PATENT DOCUMENTS 4,508,138  4/1985  Dixon ..................... 137/625.3 X Primary Examiner—Gerald A. Michalsky
Attorney, Agent, or Firm—Rogers, Howell & Haferkamp

[57] ABSTRACT

An in-line sleeve valve has a housing and a sleeve. A sleeve gate is slidably mounted to the sleeve. A velocity guide is mounted to the sleeve gate. The velocity guide, sleeve, and sleeve gate define a passage to rapidly equalize the pressure across the velocity guide upon initially opening the valve. A drive assembly has arms mounted to the housing for swinging movement. The sleeve gate has grooves for receiving slide blocks. A drive pin is pivotally mounted at the lower end of each arm to a slide block, the pin having a threaded portion and a nonthreaded portion. Each slide block has an opening receiving the nonthreaded portion of the pin, and each arm has a threaded opening threadedly engaging the threaded end of the pin. The drive assembly also has an actuator having a piston. Ends of the drive arms are rotatably connected to a drive bar. A mounting pin has an upper cylindrical portion and a lower tapered portion. The drive bar has a vertical opening slidably receiving the upper cylindrical portion of the pin. The piston has a tapered vertical opening in axial alignment with the opening of the drive bar, the tapered opening in the piston receiving the lower tapered portion of the pin.

11 Claims, 2 Drawing Sheets

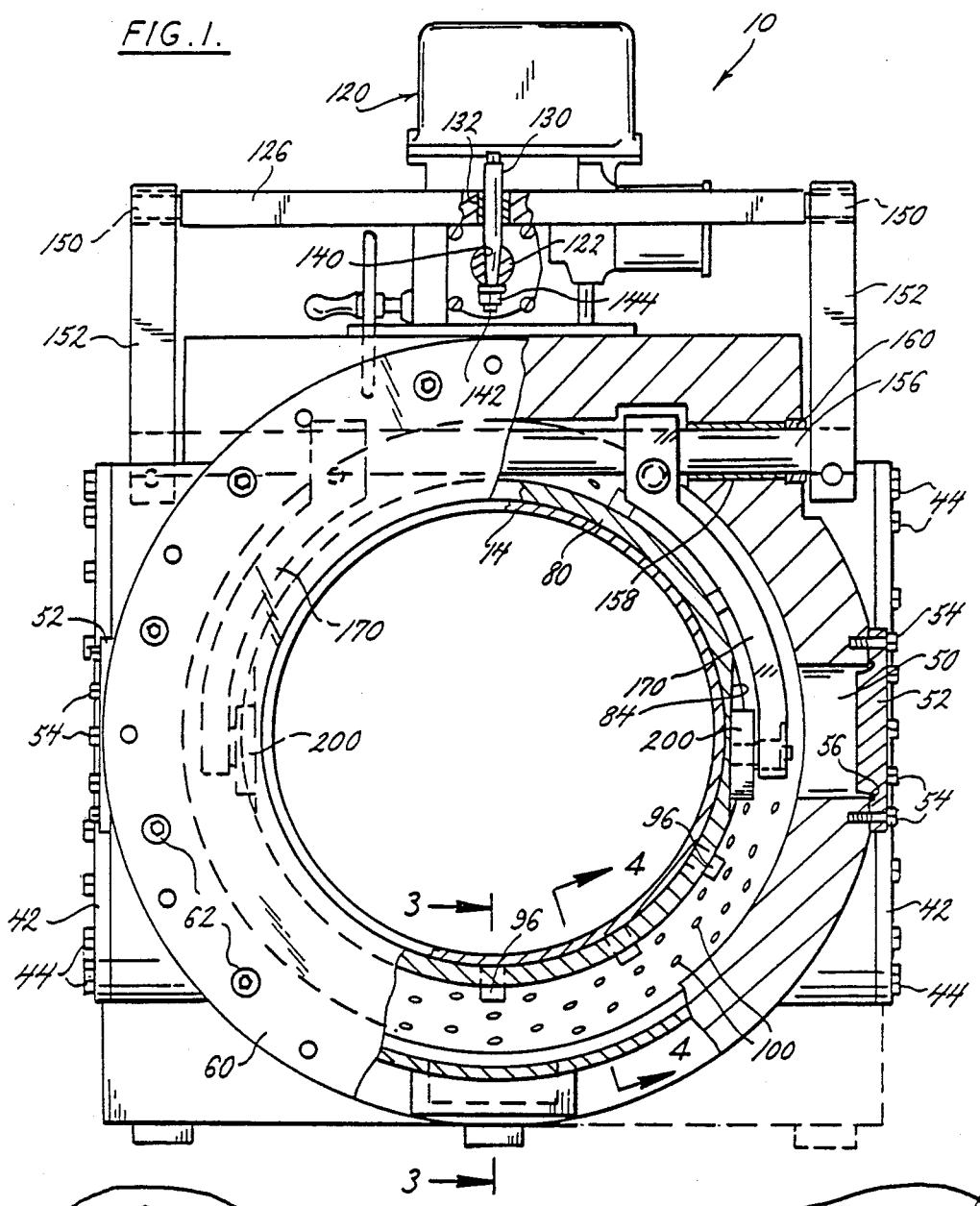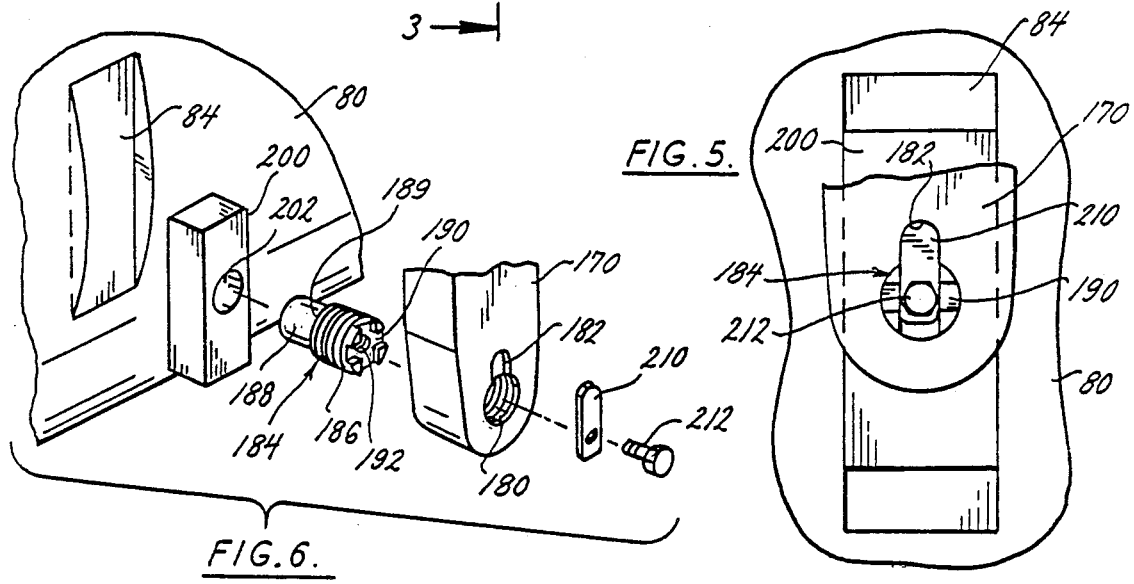

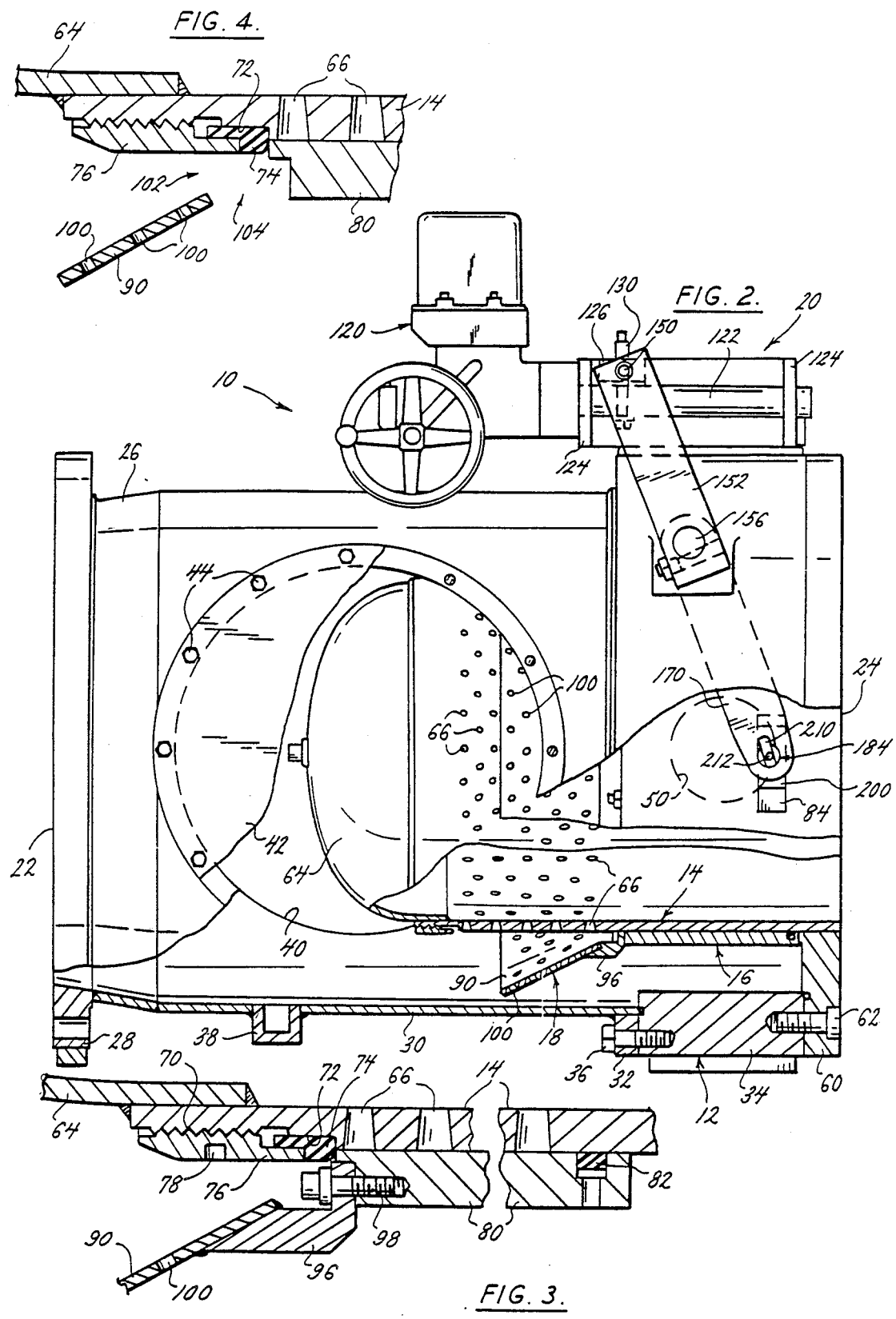

IN-LINE SLEEVE VALVE HAVING VELOCITY GUIDE PRESSURE EQUALIZATION AND DRIVE ASSEMBLY WITH IMPROVED DRIVE PIN MOUNTINGS

BACKGROUND AND DESCRIPTION OF THE PRIOR ART

This invention relates to a sleeve valve of the in-line type. More particularly, one aspect of the invention relates to such valves having a velocity guide wherein the invention is directed to a means for rapidly equalizing the pressure across the velocity guide upon initially opening the valve. Another aspect of the invention is directed to an improved drive assembly for such a valve providing easy assembly and disassembly of the valve.

In-line sleeve valves having velocity guides and drive assemblies are old in the art. Such a valve has an inlet and an outlet aligned generally along the same axis. A sleeve is mounted to a housing such that the longitudinal axis of the sleeve is generally aligned with the valve inlet axis. The sleeve has nozzles in its cylindrical wall, the nozzles being in a pattern extending substantially entirely around the cylindrical wall and over a selected length thereof. The size, shape and spacing of the nozzles are not material to this patent. A sleeve gate is slidably mounted to the sleeve and extends around the outer surface of the sleeve in sliding sealing engagement therewith. A drive assembly drives the sleeve gate between a closed position whereby the gate fully covers the nozzles to prevent the flow of fluid through the valve, and an open position whereby a selected length of the nozzle pattern is exposed to allow the maximum flow of fluid through the valve.

Such prior art in-line sleeve valves also include a velocity guide mounted to the sleeve gate and movable therewith. The velocity guide comprises a ring shaped as a conical section, the ring being located forward of the sleeve gate with the end of the largest ring diameter being forward of the end of smallest ring diameter. The purpose of the velocity guide is to maintain a constant fluid velocity at the entrance to all the exposed nozzles, by reducing the annular flow area perpendicular to the conical face of the velocity guide, to match the reduced volume of flow along the velocity guide in front of the nozzles. By maintaining a constant flow velocity over the exposed length of the nozzle pattern, velocity head loss in the annular cavity in front of the nozzles is significantly reduced, and all operating limitations, such as back pressure requirements, are removed. There is no limiting sigma value (cavitation index), and under any choked flow there is only a 15% loss in efficiency.

The prior art velocity guide has holes through the guide ring for the purpose of providing some equalization of the pressure across the velocity guide upon initially opening the valve. When the valve is fully closed, there is no pressure drop across the velocity guide, but when the valve begins to open, there is a sharp pressure drop created across the velocity guide. The purpose of the holes in the guide ring is to allow equalized pressure behind the guide, through the holes, thereby reducing the pressure drop across the guide ring under flowing conditions. However, it has been found that the holes in the ring are not sufficient to reduce the pressure drop as rapidly as desirable with the result that structural failure occurs in the velocity guide. All of this is prior art. The present invention overcomes these problems.

It is also known in the prior art to provide such an in-line sleeve valve with a drive assembly having upper and lower drive arms whereby the lower drive arms are pivotally mounted at their upper ends to the valve housing for rotation about an axis to provide swinging movement of the drive arms about that axis. Slide blocks are located at the lower ends of the arms. The valve sleeve gate has groove means in the outer surface of its side wall for receiving the slide blocks for sliding movement of the slide blocks in the groove means. The slide blocks engage the sleeve gate to slide the sleeve gate fore and aft between closed and fully open positions upon swinging movement of the drive arms. In accordance with the prior art valve of this type, each slide block is mounted to the lower end of a drive arm by a drive pin having a portion rotatably mounted in an opening in the slide block, and another portion press fit in an opening in the lower end of the drive arm. This mounting arrangement makes it difficult to assemble the valve, particularly where the valve is a large size. Typically, such valves range in size from 12 inches in diameter to 72 inches in diameter and larger. Assembly of these valves, particularly the larger ones, is difficult and even dangerous because of having to mount the valve sleeve to the housing while at the same time attempting to align the valve blocks in the sleeve gate grooves with the slide blocks, drive arms, and drive pins previously assembled. These problems are overcome by the improved mounting assembly of the present invention.

It is also known in the prior art to operate an in-line sleeve valve of the type to which this invention is directed by producing swinging movement of upper and lower drive arms in response to reciprocation of an actuator piston. The upper drive arms are rotatably mounted to opposite ends of a drive bar which in turn is mounted for reciprocating movement along an arcuate path. A bearing pin mount is provided for mounting the drive bar to the reciprocating piston so the drive bar moves fore and aft with the piston but is allowed to move vertically relative to the piston to accommodate its arcuate movement. Heretofore, the pin mount for mounting the drive bar to the piston included a pin having a threaded end that engaged a threaded hole in the piston. Such an arrangement has produced some difficulty in assembly. The present invention overcomes this problem.

SUMMARY OF THE INVENTION

With respect to the improvement in the velocity guide, in accordance with the present invention there is provided a passageway defined by the velocity guide, sleeve, and sleeve gate at the rearward end of the velocity guide ring. The passageway is located between the rearward end of the ring and the sleeve and gate and provides a flow path for the flow of fluid therethrough to rapidly equalize the pressure across the velocity guide upon initially opening the valve. This passageway is in addition to or in lieu of the holes through the guide ring, and has been found to prevent structural failure of the velocity guide.

With respect to the improved mounting assembly of the present invention which provides ease of assembly and disassembly of the valve, the drive pin for pivotally mounting the lower portion of each drive arm to a slide block has a threaded portion and a nonthreaded portion. The slide block has an opening that receives the nonthreaded portion of the drive pin for rotational movement of the pin relative to the slide block. The drive arm has a threaded opening at its lower end which threadedly engages the threaded portion of the pin. Means are provided for locking the pin and arm in a selected threaded engagement. The housing has access openings adjacent the drive pins so that the pins may be installed into the drive arms and slide blocks by way of the access openings. In this way the valve sleeve first may be mounted to the valve housing, the lower ends of the drive arms aligned with the sleeve gate grooves, a slide block placed into position in a sleeve gate groove with its opening aligned with the threaded opening in the lower end of the drive arm, and then the drive pin installed by screwing it into the threaded opening of the drive arm with the nonthreaded portion of the pin extending into the opening of the slide block. A very precise clearance can be obtained for each slide block because the pin is threadably adjustable within the drive arm. Once properly adjusted, the pin is locked in place. Disassembly is also made easy by providing easy removal of the pins from the drive arms by way of the access openings to make way for further disassembly of the valve.

In a preferred form of the invention the head of the drive pin and the drive arm have mating slots. A key is positionable in selected ones of said mating slots to lock the pin and arm in a selected threaded engagement.

Also, in accordance with the present invention, the pin mount for mounting the drive bar to the reciprocating piston comprises a pin having an upper cylindrical portion, and a lower tapered portion. The upper cylindrical portion extends through a bearing in the drive bar allowing vertical movement of the drive bar on the pin, while the lower tapered portion of the pin fits within a tapered hole in the piston. The bottom end of the pin is threaded and receives a nut. This provides ease of assembly whereby with the bearing in the drive bar generally aligned with the tapered hole in the piston, the tapered pin is inserted downwardly through the bearing such that it drops into the tapered hole. The nut is tightened on the end of the pin to draw the pin tightly into the tapered hole to lock it to the piston. Hence, the need to carefully align the threaded end of a pin with a threaded hole in the piston during assembly is eliminated.

These and other objects and advantages of the present invention are apparent from the drawing and detailed description to follow.

DESCRIPTION OF THE DRAWINGS

FIG. 1 is a rear elevation view of an in-line sleeve valve of the present invention with portions broken away to further illustrate the invention.

FIG. 2 is a side elevation view of the in-line sleeve valve of FIG. 1 with portions broken away to illustrate the invention.

FIG. 3 is an enlarged sectional view of a portion of FIG. 2 taken generally along 3—3 of FIG. 1 to further illustrate the velocity guide of the present invention.

FIG. 4 is a view similar to FIG. 3 but taken along 4—4 of FIG. 1.

FIG. 5 is an enlarged view showing the mounting of the lower end of a lower drive arm to a slide block in accordance with the present invention.

FIG. 6 is an exploded view showing the mounting of the lower end of a lower drive arm to a slide block in accordance with the present invention.

DETAILED DESCRIPTION OF PREFERRED EMBODIMENTS

With reference to the drawing there is shown an in-line sleeve valve 10 of the present invention generally including a valve body or housing 12, a valve sleeve 14 mounted to the valve body, a sleeve gate 16 slidably mounted to the valve sleeve in sealing engagement therewith to open and close the valve, a velocity guide 18 mounted to the forward end of the sleeve gate, and an actuator assembly 20 for operating the sleeve gate between closed and opened positions.

The valve has an inlet end 22 and an outlet end 24. An entrance cone 26 is mounted at the inlet and has a suitable annular mounting flange 28 at the inlet end for mounting the valve to a pipeline or the like. The valve body inlet has a generally tubular section 30 with an annular flange 32 at the rear end thereof. The valve body has a ring section 34 secured to the flange 32 by bolts 36. A trap 38 may be located at the bottom of the valve body to collect debris that may become trapped in the housing. The valve body has a large access opening 40 to provide easy access to the valve sleeve seal assembly as will be described. The access opening 40 is normally covered by a cover plate 42 mounted over the opening by bolts 44.

The valve body also has access openings 50 at opposite sides of the ring portion 34. The openings 50 are normally covered with cover plates 52 held in place with bolts 54. Both the cover plate 42 and the cover plates 52 are held in sealing engagement by o-rings such as the o-rings 56 for the cover plates 52. The central axes of the access openings 40, 50 are generally in alignment with the central longitudinal axis of the valve body.

The sleeve 14 is generally cylindrical and is mounted concentrically within the valve body. The sleeve has an annular flange 60 at its rearward end which is secured to the valve body ring 34 by bolts 62 to mount the valve sleeve within the valve body. The sleeve has a head 64 at its forward end to close off the forward end of the sleeve from fluid flow therethrough.

The forward end of the sleeve has openings in the cylindrical wall of the sleeve which openings define nozzles 66 extending substantially all the way around the sleeve in a selected pattern which extends over a selected distance rearwardly from the forward end of the sleeve. The nozzles 66 may be in any suitable pattern, but it has been found that a pattern comprised of multiple spirals is preferred.

The forward end of the sleeve 14 is threaded at 70 and has a recess 72 that receives a seal 74. The seal is held in place by a retaining ring 76 threadedly engaged with the threaded portion 70 of the sleeve. The ring has notches 78 for engagement by a Spanner wrench for assembly and disassembly of the seal. The seal 74 can be replaced by removing the retaining ring 76 by access through opening 40 without the need to disassemble the entire valve.

The sleeve gate 16 has a ring section 80 with seal rings 82 at its aft end to provide a sliding seal between the sleeve gate and the sleeve. The sleeve gate is slidably mounted on the sleeve to move between a fully closed position as shown in FIG. 3 where the forward end of the sleeve gate seals against the seal 74 and overlies all of the nozzles 66 to block the passage of fluid through the valve, and a fully opened position as shown in FIG. 2 where all of the nozzles are exposed to allow maximum flow of fluid through the valve.

The sleeve gate has groove means comprised of vertical grooves 84 that receive slide blocks as will be explained.

The velocity guide 18 includes a ring 90 shaped as a conical section and positioned with its end of largest diameter forward and its end of smallest diameter rearward. The guide ring 90 is mounted at its rear end to the forward end of the sleeve gate 16 by a plurality of spaced brackets 96 and bolts 98. The guide ring has holes 100 therethrough spaced substantially over the entire guide ring. These holes assist in reducing the pressure drop across the velocity guide upon initially opening the valve as will be further described.

The small diameter rearward end of the guide ring is spaced outwardly from the forward end of the sleeve to define an annular gap 102, and is spaced forwardly of the forward end of the sleeve gate to define gaps 104 between the brackets 96 (see FIGS. 3 and 4). The gaps 102, 104 define a flow path for fluid trapped in the chamber 106 behind the velocity guide, located between the valve body and sleeve gate, to the valve nozzles to rapidly reduce the pressure drop across the velocity guide upon initially opening the valve.

When the valve is closed, fluid with a given head pressure fills the space between the valve body and sleeve, including the space on both sides of the velocity guide so that the pressure drop across the velocity guide is zero with the valve closed. As the valve begins to open by rearward sliding of the sleeve gate to expose the nozzles at the forward end of the sleeve, the fluid between the sleeve and the velocity guide immediately begins to flow through the nozzles. If it were not for the passageway created by the slots 102, 104, there would be an abrupt reduction of pressure at the front side of the velocity guide without a corresponding reduction at the back side. This produces a large pressure drop across the velocity guide causing structural failure of the velocity guide with repeated opening and closing of the valve. The passageway created by the slots 102, 104 provides a sufficient flow path for the fluid at the back side of the velocity guide toward the nozzles to rapidly reduce the pressure drop across the velocity guide as the valve is opened and thereby eliminates the structural failure previously experienced.

The actuator assembly 20 includes a standard actuator 120, which for example may be of the gear operator or motor operator type having a reciprocating piston or guide rod 122 supported by bearings 124. Operation of the actuator 120 extends and retracts the piston 122.

A rectangular drive bar 126 moves back and forth with the piston, but is also allowed to move vertically relative to the piston. A pin 130 is slidably mounted in a bearing 132 in a vertical opening in the drive bar. The pin 130 has an upper generally cylindrical portion that moves vertically within the bearing 132, and a tapered lower portion that extends through a tapered hole 140 in the piston 122. The pin 130 has a threaded end 142 at the bottom that receives a nut 144.

The pin mount 130 provides an easy and reliable way to mount the drive bar to the reciprocating piston 122. With the drive bar generally aligned over the tapered hole 140 in the piston, the pin 130 is dropped through the bearing 132 and into the tapered hole. This is easily accomplished even if there is a slight misalignment between the bearing 132 and tapered hole. The nut 144 is tightened onto the end of the pin to draw the tapered portion tightly into engagement with the tapered hole 140 to securely lock the pin to the piston.

Trunion pins 150 are integrally formed at the ends of the drive bar 126. The upper ends of upper drive arms 152 are pivotally mounted on the trunion pins 150. Suitable means (not shown) are provided for lubricating the pivotal connections of the upper drive arms to the trunion pins.

The lower ends of the upper drive arms are secured to a shaft 156 rotatably mounted in the valve body in suitable bearings 158. Packing 160 is provided between the valve body and the shaft 156 to prevent fluid from leaking from the valve body.

The mounting of the lower ends of the arms 152 to the shaft 156 utilizes locking pins as generally described in U.S. Pat. No. 4,579,477. This provides an exceptionally secure way to lock the shaft 156 to the arms 152.

Lower drive arms 170 are secured at their upper ends to the shaft 156 which may also use pins as disclosed in U.S. Pat. No. 4,579,477. The arms 170 are curved to follow the circular contour of the sleeve gate, and are located between the sleeve gate and the valve body. Hence, the upper arms 152 are external of the valve body, while the lower arms 170 are internal of the valve body.

As best shown in FIGS. 5 and 6, the lower end of each arm 170 has a threaded opening 180 and a slot 182. A drive pin 184 has a threaded portion 186 and a nonthreaded portion 188. The threaded portion 186 is of larger diameter than the nonthreaded portion 188 creating a surface 189 at the junction of the threaded and non-threaded portions. The threaded portion of the pin has a slotted head as shown at 190 and a threaded hole 192.

Slide blocks 200 having openings 202 are received within the vertical grooves 84 at each side of the sleeve gate for vertical movement of the blocks in the grooves. The threaded portion 186 of the drive pin is threadedly engaged with the threaded hole 180 at the lower end of the drive arm 170, and the nonthreaded portion 188 of the drive pin extends within the opening 202 of the slide block such that the drive pin rotates relative to the slide block. The clearance between the slide block and the bottom of the groove 84, and the clearance between the slide block and the surface 189 of the drive pin are adjustable by adjusting the threaded engagement of the drive pin in the opening 180. Once properly adjusted, the drive pin is locked with the drive arm 170 by means of a key 210 that fits within the slots 182, 190. The key is held in position by a bolt 212 that screws into the opening 192 as shown in FIG. 5.

The drive pin mounting depicted in FIGS. 5 and 6 makes it comparatively easy to assemble and disassemble the valve. To assemble the valve, the sleeve and sleeve gate may be placed in position within the valve body without the need to first mount the slide blocks 200 to the arms 170. After the sleeve and sleeve gate are mounted to the valve body, a block 200 is slid in position by moving it upwardly within the groove 84 until the hole 202 is in alignment with the hole 180 at the lower end of the arm 170. The arm 170 and sleeve gate are positioned such that the lower end of the arm 170 and the groove 84 are generally aligned with the access opening 50. Then the drive pin 184 is inserted into the threaded opening 180 (nonthreaded end of the drive pin first) and is then screwed into the threaded opening 180 until the nonthreaded end of the drive pin extends into the opening 202 in the slide block 200. The drive pin is screwed into the lower end of the drive arm until the selected clearance is achieved as previously described. When properly adjusted the key 210 and bolt 212 lock the drive pin in position. The same procedure is used to mount the other slide block. Easy disassembly is achieved by simply reversing the procedure by first removing the drive pins before disassembling the sleeve and sleeve gate from the valve body.

In operation of the in-line sleeve valve, operation of the actuator 120 reciprocates (extends or retracts) the piston 122 which in turn causes the drive bar 126 to move in an arcuate path made possible by the pin mount 130. Of course, the drive bar is caused to move in an arcuate path due to the connection of the upper drive arms 152 to the rotatable shaft 156. Reciprocating movement of the piston 122 produces rotation of the shaft 156 which in turn produces swinging movement of the lower drive arms 170. Swinging movement of the lower drive arms causes the sleeve gate 16 to slide through engagement of the slide blocks 200 and the sides of the grooves 84. As the lower ends of the drive arms 170 move in an arcuate path, the slide blocks 200 move vertically within the grooves 84. In this way the sleeve gate is operated between a fully closed position as shown in FIG. 3 and a fully open position as shown in FIG. 2.

What is claimed is:

1. An in-line sleeve valve having an inlet and an outlet aligned generally along the same axis said valve comprising:
   a housing;
   a sleeve mounted to the housing, the longitudinal axis of said sleeve being generally aligned with the housing inlet axis, said sleeve having nozzles in the cylindrical wall thereof, said nozzles being in a pattern extending over a selected length thereof;
   a sleeve gate slidably mounted to the sleeve, said sleeve gate extending around the outer cylindrical surface of the sleeve in sliding sealing engagement therewith;
   means for sliding said sleeve gate between a closed position whereby said gate fully covers said nozzles to prevent the flow of fluid through said valve, and a fully open position whereby said nozzles are exposed to allow the maximum flow of fluid through said valve; and
   a velocity guide mounted to said sleeve gate and movable therewith, said guide comprising a ring shaped of generally conical section, said ring being located forward of said sleeve gate, the end of largest ring diameter being forward of the end of smallest ring diameter, the velocity guide directing the fluid entering the valve inlet toward said nozzles and assisting in controlling the velocity of the fluid passing through said nozzles to provide a more constant velocity of fluid flow through the nozzles over the exposed length of the nozzle pattern, said velocity guide, sleeve, and sleeve gate defining a passage means at the rearward end of said velocity guide ring between the rearward end of the ring and the sleeve and gate for the flow of fluid therethrough to rapidly equalize the pressure across the velocity guide upon initially opening the valve.

2. The in-line sleeve valve of claim 1 wherein the rearward end of the velocity guide is spaced radially from said sleeve to define a generally annular gap therebetween.

3. The in-line sleeve valve of claim 2 wherein the rearward end of said velocity guide is spaced forwardly of the forward end of said sleeve gate to define a generally annular gap therebetween.

4. The in-line sleeve valve of claim 3 wherein said velocity guide has openings therethrough, said openings being in a pattern extending substantially over the entire velocity guide ring.

5. An in-line sleeve valve having an inlet and an outlet aligned generally along the same axis said valve comprising:
   a housing;
   a sleeve mounted to the housing, the longitudinal axis of said sleeve being generally aligned with the housing inlet axis, said sleeve having nozzles in the cylindrical wall thereof, said nozzles being in a pattern extending over a selected length thereof;
   a sleeve gate slidably mounted to the sleeve, said sleeve gate extending around the outer cylindrical surface of the sleeve in sliding sealing engagement therewith;
   means for sliding said sleeve gate between a closed position whereby said gate fully covers said nozzles to prevent the flow of fluid through said valve, and a fully opened position whereby a maximum selected length of said nozzle pattern is exposed to allow the maximum flow of fluid through said valve;
   said means for sliding said sleeve gate further comprising:
      a drive assembly having arms pivotally mounted at their upper ends to said housing for rotation about an axis for swinging movement of said arms about said axis;
      slide blocks at the lower ends of said arms, said sleeve gate having groove means in the outer surface of the wall thereof for receiving said slide blocks for sliding movement of the slide blocks therein, said slide blocks engaging said sleeve gate to slide said sleeve gate fore and aft between said closed and fully open positions upon swinging movement of said arms; and
      a drive pin for pivotally mounting the lower end of each of said arms to one of said slide blocks, said pin having a threaded portion and a nonthreaded portion, each slide block having an opening receiving the nonthreaded portion of said pin for rotational movement of the pin relative to the slide block, each arm having a threaded opening at the lower end thereof threadedly engaging the threaded end of the pin.

6. The in-line sleeve valve of claim 5 further comprising means for locking said pin and arm in a selected threaded engagement.

7. The in-line sleeve valve of claim 6 wherein the head of each drive pin and each arm have mating slots and a key positionable in selected ones of said mating slots to lock said pin and arm in a selected threaded engagement.

8. The in-line sleeve valve of claim 5 wherein said housing has access openings adjacent the drive pins for ease in assembly and disassembly of the slide blocks, drive pins, and arms for ease in assembly and disassembly of the valve.

9. The in-line sleeve valve of claim 5 wherein the threaded end of said drive pin is of larger diameter than its nonthreaded end, whereby said pin is removable from said slide block by unscrewing and withdrawing the pin from the threaded hole of the arm.

10. An in-line sleeve valve having an inlet and an outlet, said valve comprising:

a housing;

a sleeve mounted to the housing, said sleeve having nozzles in the cylindrical wall thereof;

a sleeve gate slidably mounted to the sleeve, said sleeve gate extending around the outer surface of the sleeve cylindrical wall in sliding sealing engagement therewith;

means for sliding said sleeve gate between a closed position whereby said sleeve gate fully covers said nozzles to prevent the flow of fluid through said valve, and an open position exposing said nozzles to allow the flow of fluid through said valve;

said means for sliding said sleeve gate further comprising:

an actuator having a linearly extendable and retractable piston;

drive arms for sliding said sleeve gate between closed and opened positions in response to extension and retraction of said piston;

a drive bar to which ends of said drive arms are rotatably connected, said ends of said drive arms and said drive bar moving in an arcuate path in response to extension and retraction of said piston; and mounting means for mounting said drive bar to said piston for providing said arcuate movement of said drive bar in response to extension and retraction of said piston;

said mounting means further comprising:

a mounting pin having an upper cylindrical portion and a lower tapered portion, the drive bar having a vertical opening therein for slidably receiving the upper cylindrical portion of said mounting pin to allow vertical movement of said drive bar relative to said mounting pin, said piston having a tapered vertical opening therein in axial alignment with the opening in the drive bar, the tapered opening in the piston receiving the lower tapered portion of the mounting pin; and means for securing the mounting pin to the piston;

whereby the drive bar extends and retracts in response to extension and retraction of the piston but is allowed to move vertically relative to the piston in response to arcuate movement of the upper ends of said drive arms.

11. The in-line sleeve valve of claim 10 wherein said mounting pin is threaded at its lower end for receiving a threaded nut to draw the lower tapered portion of the drive pin tightly into engagement with the tapered hole in the piston.

* * * * *